United States Patent [19]  [11]  4,258,022
Elsner et al. [45] Mar. 24, 1981

[54] CONTINUOUS PRODUCTION OF PHOSPHINE

[75] Inventors: Georg Elsner, Hürth-Knapsack; Werner Klose, Erftstadt; Christian May, Erftstadt; Gero Heymer, Erftstadt, all of Fed. Rep. of Germany

[73] Assignee: Hoechst Aktiengesellschaft, Fed. Rep. of Germany

[21] Appl. No.: 75,001

[22] Filed: Sep. 12, 1979

[30] Foreign Application Priority Data

Sep. 15, 1978 [DE] Fed. Rep. of Germany ....... 2840147

[51] Int. Cl.³ .............................................. C01B 25/00
[52] U.S. Cl. ..................................... 423/299; 423/307
[58] Field of Search ....................... 423/299, 305, 307; 568/918

[56] References Cited

U.S. PATENT DOCUMENTS

| 3,391,190 | 7/1968 | Kilsheimer et al. | 568/918 |
| 3,888,971 | 6/1975 | Scheibitz et al. | 423/307 |
| 4,143,121 | 3/1979 | Stenzel et al. | 423/299 |

FOREIGN PATENT DOCUMENTS 2549084  5/1977  Fed. Rep. of Germany ........... 423/299

OTHER PUBLICATIONS

Gaylord, Polyethers, part I, Interscience Publishers, (1963), pp. 173-175.

Primary Examiner—O. R. Vertiz
Assistant Examiner—Wayne A. Langel
Attorney, Agent, or Firm—Connolly and Hutz

[57] ABSTRACT

The invention relates to the continuous production of phosphine. To this end, elemental phosphorus is reacted with an aqueous alkali metal hydroxide solution and at least one alcohol, the reactants being used in admixture with 0.01 to 2 weight % of a surfactant, the percentage being based on the alcohol.

2 Claims, No Drawings

CONTINUOUS PRODUCTION OF PHOSPHINE

The present invention relates to a process for producing a continuous stream of highly concentrated phosphine (hydrogen phosphide), wherein a mixture containing elemental yellow phosphorus, an aqueous alkali metal hydroxide solution and at least one alcohol with at least 5 carbon atoms is reacted with agitation in a reaction zone. The resulting gaseous reaction products with the phosphane therein are collected, the reaction residue is separated into an aqueous phase and alcoholic phase, and the latter phase is recycled to the reaction zone.

A process of this kind has been described, e.g. in German Patent Specification "Offenlegungsschrift" No. 26 32 316. In carrying out this process, it has turned out that it is impossible to avoid adverse effects on the quantitative ratio of $PH_3:H_2$ in the gaseous reaction product unless the reaction medium, which is recycled, is carefully purified alcohol. Careful purification of the alcohol can only be achieved, however, by allowing emulsified water to settle over a period of several weeks, for example.

Further adverse effects reside in the following points: Whenever the starting reactants cease to be used in stoechiometric proportions or whenever water in excess gets into the reaction zone together with recycled alcohol, the salt suspension which is being formed inside the reactor commences caking together and then naturally ceases to be conveyable. As a result, it is necessary for the production unit to be frequently stopped and cleaned by expensive methods.

In accordance with our present invention, we have now unexpectedly found that the prior art process described above can be considerably improved by using the reactants in admixture with 0.01–2, preferably 0.1–0.4, weight %, based on the alcohol, of a surfactant.

Use can more specifically be made of known non-ionic, cationic or anionic surfactants which primarily comprise: ethoxylated $C_4$–$C_{22}$ alcohols; alkyl phenols with 8 to 12 carbon atoms in the alkyl group; phosphoric acid monoesters and diesters of these alcohols or phenols; ammonium salts containing at least one alkyl group with 12 to 18 carbon atoms; ether sulfates or alcanols; alkylbenzene sulfonates; alkenyl sulfonates; or sodium salts of these compounds with 8 to 18 carbon atoms in the alkyl or alkenyl group.

The process of the present invention inter alia offers the following technically beneficial effects:

(a) the salt suspension which is being formed is easy and reliably to convey and transport;

(b) alcohol and aqueous phase are easier to separate after the reaction and the separated alcohol can more readily be used again;

(c) the concentration of $PH_3$ in the gaseous reaction product remains sufficiently high even in those cases in which the starting reactants are used outside the stoechiometric ratio, and (d) the concentration of $PH_3$ in the gas stream and yield of desirable product are increased.

The following Examples illustrate the invention and technically beneficial effects which are associated therewith.

EXAMPLES 1 to 20

Yellow elemental phosphorus and a sodium hydroxide solution of 70% strength were reacted, with agitation, in an apparatus such as that described in Example 3 of German Patent Specification "Offenlegungsschrift" No. 26 32 316. The dispersant and reaction medium was a 1:1 (ratio by weight) mixture of n-octanol and n-decanol which was used as such and in admixture with 0.1 weight % of surfactant, respectively. The yield of hydrogen phosphide, its concentration in the resulting gas, and the nature of the particular surfactant used are indicated in the following Table, in which ethylene oxide is briefly termed EO.

TABLE 1:

| Ex. No. | Surfactant | vol % $PH_3$ in gas | % P in form of $PH_3$ P used |
|---|---|---|---|
| 1 | None | 91.0 | 28.8 |
| 2 | Addition product of 6 mols EO and nonylphenol | 94.0 | 29.0 |
| 3 | Addition product of 10 mols EO and nonylphenol | 93.6 | 31.2 |
| 4 | Addition product of 6 mols EO and 1 mol mixture of linear $C_{12}$–$C_{15}$ alcanols | 92.1 | 30.9 |
| 5 | Addition product of 5 mols EO and 1 mol mixture of $C_{16}$–$C_{20}$ alcanols | 93.0 | 31.4 |
| 6 | Sodium salt of alkenylsulfonic acids with 14 to 17 carbon atoms | 91.5 | 30.2 |
| 7 | $C_{12}H_{25}$—$(OCH_2$—$CH_2)_n$ $SO_4^-Na^+$ n = 2 to 5 | 93.0 | 29.9 |
| 8 | Sodium salt of dodecylbenzene-sulfonic acid | 92.4 | 29.8 |
| 9 | An about equimolar mixture of phosphoric acid mono- and diesters of an addition product of 4 mols EO and 1 mol n-dodecanol | 92.5 | 29.0 |
| 10 | An about equimolar mixture of phosphoric acid mono- and diesters of an addition product of 6 mols EO and 1 mol nonylphenol | 94.3 | 32.1 |
| 11 | An about equimolar mixture of phosphoric acid mono- and di-2-butoxyethyl esters | 94.0 | 29.8 |
| 12 | An about equimolar mixture of phosphoric acid mono- and diesters of an addition product of 2 mols EO and 1 mol of a commerical mixture of fatty alcohols with a chain length of $C_{16}$ to $C_{20}$ | 94.7 | 32.2 |
| 13 | Addition product of 4 mols EO and 1 mol n-dodecanol | 93.0 | 31.5 |
| 14 | An about equimolar mixture of phosphoric acid mono- and diesters of an addition product of 4 mols EO and 1 mol nonylphenol | 94.4 | 30.7 |
| 15 | Same as in Ex. 14, but with 8 mols EO | 94.2 | 31.2 |
| 16 | Same as in Ex. 14, but with 15 mols EO | 94.0 | 32.1 |
| 17 | Same as in Ex. 14, but with 10 mols EO | 93.8 | 32.1 |
| 18 | Same as in Ex. 14, but with 23 mols EO | 93.0 | 30.7 |
| 19 | $(CH_3)_2N(C_{12}H_{25})_2{}^+Cl^-$ | 93.0 | 31.5 |
| 20 | $C_{12}H_{25}N(CH_3)_2(CH_2$—$C_6H_5)^+Cl^-$ | 92.8 | 30.9 |

EXAMPLES 21 to 29

Hydrogen phosphide was produced in a pilot plant which comprised two double-walled glass vessels, of which each had a capacity of 50 liters, provided with agitator, reflux condenser, bottom outlet valve and various dosing means for metered supply of the reactants. To this end, elemental yellow phosphorus was reacted with sodium hydroxide solution of 70% strength in an alcohol mixture which was composed of 35% of n-pentanol, 15% of 2-methylbutanol, 25% of n-octanol and 25% of n-decanol, and was additionally admixed with about 0.1 weight %, based on alcohol, of one of the surfactants specified hereinabove. Phosphorus, sodium hydroxide solution and alcohol mixture were used in a ratio by volume of 1:1.4:12 and continuously metered into the first of the above two vessels. A continuously flowing stream of hydrogen phosphide was formed. It was cooled and purified with the use of an active carbon filter, and determined quantitatively and qualitatively.

The dispersion, which was not fully reacted in the first vessel reactor, still contained elemental phosphorus together with phosphite and hypophosphite. It was discontinuously introduced into the second vessel reactor and admixed therein with fresh sodium hydroxide solution so as to obtain a light grey to light beige colored dispersion free from elemental phosphorus. The resulting gas which substantially consisted of hydrogen with varying proportions of hydrogen phosphide, was used for further reaction or incinerated. The salt dispersion which substantially contained sodium phosphite $Na_2HPO_3$ was discontinuously introduced into a stirring vessel, admixed therein with a quantity of water just sufficient to dissolve the salts. The resulting emulsion was placed in a phase separating means and alcohol mixture and aqueous phase were separated from one another. The alcohol was suitable for further use.

The results obtained and test parameters relevant in the present process are indicated in the following Table.

TABLE 2

| Ex. No. | NaOH 70% (l/h) | Vol % $PH_3$ in gas | $PH_3$ yield % | Surfactant | NaOH 2nd reactor (l/h) | Observations |
|---|---|---|---|---|---|---|
| 21 | 2.8 | 90 | 28.8 | none | 2.3 | Discharge unaffected; alcohol turbid |
| 22 | 2.4 | 91 | 26.7 | none | 2.9 | Viscous dispersion in 1st reactor; reluctant discharge; salts coalesce; poor discharge from 2nd reactor; gas-evolving sludge in separator |
| 23 | 3.0 | 87 | 28.0 | none | 2.1 | Discharge from 1st reactor obstructed; test stopped after 2 hours |
| 24 | 2.8 | 94 | 34.0 | 0.1% | 2.4 | Reliable; clear alcohol; little sludge |
| 25 | 2.4 | 94 | 31.0 | 0.1% surfactant, Ex. 17 | 3.0 | Same result as in Ex. 24 |
| 26 | 3.0 | 91 | 32.0 | 0.1% surfactant, Ex. 17 | 2.0 | Same result as in Ex. 24 |
| 27 | 2.8 | 95 | 33.7 | 0.1% surfactant, Ex. 10 | 2.3 | Same result as in Ex. 24 |
| 28 | 2.4 | 93 | 30.5 | 0.1% surfactant, Ex. 10 | 3.1 | Same result as in Ex. 24 |
| 29 | 3.0 | 91 | 31.0 | 0.1% surfactant, Ex. 10 | 1.9 | Same result as in Ex. 24 |

Used in all of the Examples:
2 l/h of phosphorus
24 l/h of alcohol
Test conducted over period of 8 hours

We claim:

1. In the process for the continuous production of phosphane, wherein a mixture containing elemental yellow phosphorus, an aqueous alkali metal hydroxide solution and at least one alcohol with at least 5 carbon atoms as a reaction medium is reacted with agitation in a reaction zone, the resulting gaseous reaction products with the phosphane therein are collected, the reaction residue is separated into an aqueous phase and alcoholic phase, and the alcoholic phase is recycled to the reaction zone, the improvement which comprises: using the reactants in admixture with 0.01 to 2 weight %, based on the alcohol, of a surfactant selected from the group consisting of an addition product of ethylene oxide with an alcohol having 4 to 22 carbon atoms or with an alkyl phenol having 14 to 18 carbon atoms, the addition product containing 1 to 25 mols of ethylene oxide per mol of alcohol or alkyl phenol, a phosphoric acid monoester or phosphoric acid diester or a phosphoric acid monoester-diester mixture of an addition product of ethylene oxide with an alcohol having 4 to 22 carbon atoms or an alkyl phenol having 14 to 18 carbon atoms, the addition product containing 1 to 25 mols of ethylene oxide per mol of alcohol or alkyl phenol, an ether sulfate of an alkanol, alkylbenzene sulfonate, alkenylsulfonate or a sodium salt of these compounds containing 10 to 18 carbon atoms in the alkyl or alkenyl group, an ammonium salt containing at least one alkyl group having 12 to 18 carbons atoms.

2. The process as claimed in claim 1, wherein the reactants are used in admixture with 0.1 to 0.4 weight % of the surfactant, based on the alcohol.

* * * * *